United States Patent
Smeets

(10) Patent No.: US 6,339,645 B2
(45) Date of Patent: *Jan. 15, 2002

(54) PSEUDO-RANDOM SEQUENCE GENERATOR AND ASSOCIATED METHOD

(75) Inventor: Bernhard Jan Marie Smeets, Dalby (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,390

(22) Filed: Mar. 6, 1998

(51) Int. Cl.$^7$ .................................................. H04L 9/00
(52) U.S. Cl. ........................... 380/46; 380/44; 708/250; 331/78
(58) Field of Search ............................... 380/44, 46, 28; 331/78; 708/250, 252–4, 256

(56) References Cited

U.S. PATENT DOCUMENTS

| | | | | |
|---|---|---|---|---|
| 4,755,987 A | * | 7/1988 | Lee et al. | 370/77 |
| 5,377,270 A | * | 12/1994 | Koopman, Jr. et al. | 380/25 |
| 5,745,522 A | * | 4/1998 | Heegard | 375/208 |
| 5,859,912 A | * | 1/1999 | Hershey et al. | 380/42 |

FOREIGN PATENT DOCUMENTS

| | | |
|---|---|---|
| EP | 100758 | 12/1998 |
| FR | 2 619 976 A1 | 3/1989 |
| FR | 2 721 414 A1 | 12/1995 |

OTHER PUBLICATIONS

Smeets et al, "Windmill PN–Sequence Generators," IEEE Proc. E.Computers & Digital Techniques, vol. 136, pp. 401–404, Sep. 1989.*

Warlick et al, "High Speed M–Sequence Generators," IEEE Trans. Computers, vol. C–29, No. 5, May 1980.*

Arvillias et al, "Combinational Logicfree Realisations for High–Speed m–Sequence Generation," Electronic Letters, vol. 13, No. 17, pp. 500–502, Aug. 1977.*

*Windmill PN–Sequence Generators* by B.J.M. Smeets and W.G. Chambers, XP000065712; IEEE Proceedings E. Computers & Digital Techniques; vol. 136, Sep. 1, 1989, pp. 401–404.

PhD Thesis, *Some Results on Linear Recurring Sequences*, Ben Smeets, Mar. 11, 1987.

*Combinational Logicfree Realisations for High–Speed m–Sequence Generation* by A.C. Arvillias and D.G. Maritsas; Electronics Letters, vol. 13, No. 17, Aug. 18, 1977, pp. 500–502.

*High–Speed M–Sequence Generators* by William W. Warlick, Jr. and John E. Hershey, IEEE Transactions on Computers, vol. C–29, No. 5, May 1980.

* cited by examiner

*Primary Examiner*—Albert Decady
*Assistant Examiner*—Stephen Kabakoff
(74) *Attorney, Agent, or Firm*—Jenkens & Gilchrist

(57) ABSTRACT

A method, and associated apparatus, for generating a pseudo-random number sequence. Determinations are made of compatible configurations of windmill generators for a selected windmill polynomial. Implementation of a windmill generator is made through use of word-oriented memory elements. Words stored in the memory elements are selectively outputted to form portions of a pseudo-random number sequence.

19 Claims, 7 Drawing Sheets

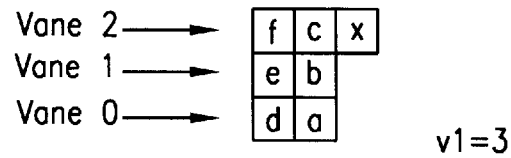
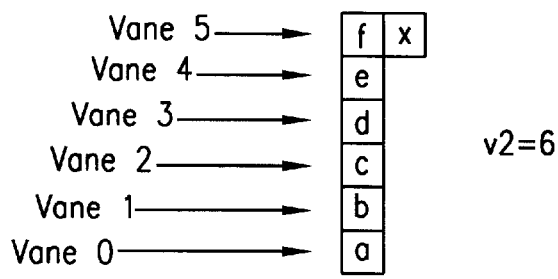
FIG. 5
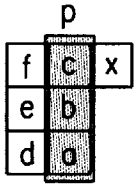
FIG. 6

| Windmill Polynomial | feasible v values (that are multiples of 3) +: 1=L mod v, -: v-1=L mod v |
|---|---|
| $x^7+x^6+1$ | 3+,6+ |
| $x^{17}+x^6+1$ | 3-,6- |
| $x^{17}+x^{12}+1$ | 3-,6-,12 |
| $x^{25}+x^{18}+1$ | 3-,6-,9,18 |
| $x^{25}+x^{18}+1$ | 3+,6+,9,18 |
| $x^{31}+x^6+1$ | 3+,6+ |
| $x^{31}+x^{18}+1$ | 3+,6+,9,18 |
| $x^{31}+x^{24}+1$ | 3+,6+,12,24 |
| $x^{47}+x^{42}+1$ | 3-,6-,21,42 |
| $x^{49}+x^{12}+1$ | 3+,6+,12+ |
| $x^{55}+x^{24}+1$ | 3+,6+,12,24 |
| $x^{65}+x^{18}+1$ | 3-,6-,9,18 |
| $x^{71}+x^6+1$ | 3-,6- |
| $x^{71}+x^{18}+1$ | 3-,6-,9-,18- |
| $x^{71}+x^{36}+1$ | 3-,6-,9-,18-,36- |
| $x^{73}+x^{42}+1$ | 3+,6+,21,42 |
| $x^{73}+x^{48}+1$ | 3+,6+,12+,24+,48 |
| $x^{79}+x^{60}+1$ | 3+,6+,12,15,30,60 |
| $x^{95}+x^{78}+1$ | 3-,6-,39,78 |
| $x^{95}+x^{84}+1$ | 3-,6-,21-,42 |
| $x^{97}+x^6+1$ | 3+,6+ |
| $x^{97}+x^{12}+1$ | 3+,6+,12+ |
| $x^{103}+x^{30}+1$ | 3+,6+,15,30 |
| $x^{103}+x^{72}+1$ | 3+,6+,9,12,18,24,36,72 |
| $x^{103}+x^{90}+1$ | 3+,6+,9,15,18,30,45,90 |
| $x^{113}+x^{30}+1$ | 3-,6-,15,30 |
| $x^{121}+x^{18}+1$ | 3+,6+,9,18 |
| $x^{127}+x^{30}+1$ | 3+,6+,15,30 |
| $x^{127}+x^{120}+1$ | 3+,6+,12,15,24,30,60,120 |
| $x^{127}+x^{126}+1$ | 3+,6+,9+,18+,21+,42+,63+,126+ |

*FIG. 7*

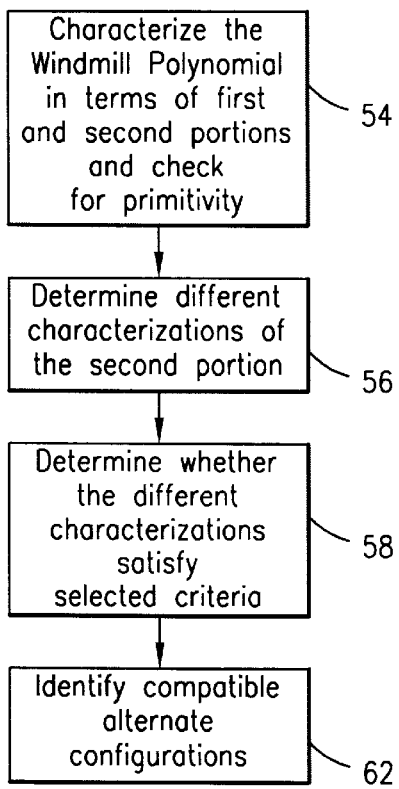
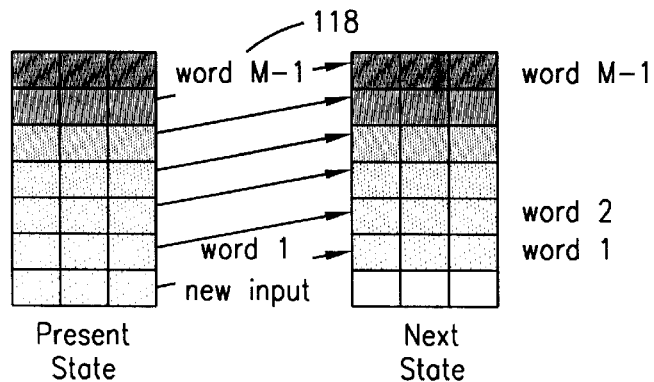
FIG. 10
FIG. 8
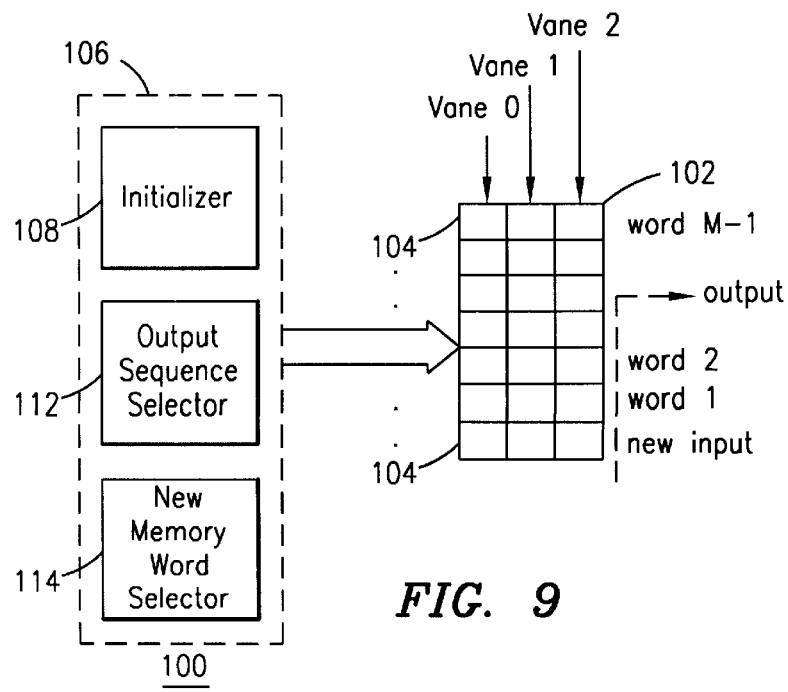
FIG. 9

PSEUDO-RANDOM SEQUENCE GENERATOR AND ASSOCIATED METHOD

The present invention relates generally to the generation of pseudo-random number sequences used, for example, in encryption procedures. More particularly, the present invention relates to a pseudo-random number sequence generator, and an associated method, by which to generate a pseudo-random number sequence corresponding to a sequence generated by a selected windmill polynomial. The present invention further relates to a manner by which to determine compatibility between different configurations of windmill polynomial-based pseudo-random sequence generators.

Word-oriented memory elements are used to store words which form the pseudo-random number sequence. The sizes of the memory words are selected such that sizes of sequence portions generated by the windmill generator during successive iterations of operations can be readily increased, as desired, thereby to facilitate the generation of the same pseudo-random number sequence at increased rates, corresponding to alternate, compatible windmill generator constructions.

The pseudo-random number sequence generated through operation of an embodiment of the present invention is advantageously utilized as part of a system to encrypt data to be communicated over a radio link, such as a radio link formed between a mobile terminal and a radio base station of a cellular communication system. The pseudo-random number sequence generated through operation of an embodiment of the present invention is also advantageously utilized in spread-spectrum (e.g., Code Division Multiple Access) communications, in automated ranging systems, in voice signal compression methods, and in radar systems.

BACKGROUND OF THE INVENTION

A communication system is operable to communicate information between a sending station and a receiving station by way of a communication channel. In a wireline communication system, the communication channel is formed of a fixed connection between the sending and receiving stations. And, in a radio communication system, the communication channel forms a portion of the electromagnetic frequency spectrum. Because a fixed connection is not required to form the communication channel between the sending and receiving stations of a radio communication system, communications are possible when a fixed connection between the sending and receiving stations would be impractical.

A digital communication system is a communication system in which information to be communicated by a sending station to a receiving station is digitized. A digital communication system can be implemented in both a wireline communication system and a radio communication system. A digital communication system permits more efficient utilization of the communication channel extending between the sending and receiving stations, thereby permitting the communication capacity of the communication system to be increased over that of a conventional, analog communication system.

Communications between sending and receiving stations are sometimes desired to be private in nature. That is to say, parties sending and receiving the communication signals intend only for the sending and receiving parties to be able to access the informational content of the communication signals. Particularly when the communication channel is a radio communication channel of a radio communication system, privacy of the communications between the sending and receiving stations becomes problematical. As a radio channel is inherently public in nature, a communication signal transmitted upon the radio communication channel can be detected by any receiving station, within range of the communication signal, and tuned to the radio channel. An unauthorized party, for instance, is able to tune a radio receiver to the frequency of the radio channel upon which the communication signal is transmitted, thereby to receive the communication signal. Analogous security problems are also of concern in wireline communication systems in the event that an unauthorized party gains access to the wireline communication channel.

One manner by which to improve the security of communications in a communication system is to encrypt the information forming a communication signal into encrypted form. If only authorized parties are able to de-encrypt the encrypted communication signal, an unauthorized party is unable to discern the informational content of the communication signal transmitted upon the communication channel. Thereby, privacy of communications is better assured.

A digital information signal is particularly amenable to an encryption process. A digital information signal is formed of sequences of bits, and each bit, if desired, of the information signal can be encoded into encrypted form at the sending station prior to its transmission upon the communication channel. An unauthorized party, without knowledge of the manner by which the information signal is encrypted is unable to de-encrypt a receive signal to recover the informational content of the transmitted signal. Only a receiving station capable of de-encrypting the encrypted signal is able to recover the informational content of the receive signal.

Various manners are used by which to encrypt the digital information signal. A typical encryption scheme, such as that used in cellular communications, utilizes an encryption process by which the digitized bits of an information signal are combined with the bits of a pseudo-random sequence generated by a pseudo-random sequence generator. The pseudo-random sequence generator is operable in conjunction with a secret key which, in a symmetrical encryption technique, is known to the sending station and to an authorized receiving station. The secret key is used at the authorized receiving station to de-encrypt the encrypted signal received thereat, thereby to recover the informational content of the transmitted signal.

The pseudo-random number sequences are sometimes derived by the calculation of a windmill polynomial. Constructions, whether hardware or software implemented, which form pseudo-random number sequences in this manner are sometimes referred to as windmill generators. Output bits generated by a windmill generator form the pseudo-random number sequences which are used, inter alia, to encrypt an information signal. A windmill generator is directly related to a selected, primitive polynomial over some finite field $GF(q)$. When $q=2$, the finite field $GF(2)$ is referred to as the binary case and is of significance particularly in digital communications. The number of primitive polynomials from which a windmill generator can be derived is limited due to many constraints placed on the polynomial. Especially in the binary case when the polynomial is required to exhibit, to minimize processing operations needed to generate outputs therefrom, only a few non-zero coefficients, the number of suitable polynomials which can be used to form a windmill polynomial is limited. The number of non-zero coefficients of a polynomial is referred to as the weight of the polynomial.

Tables exist which list primitive polynomials, such as, for the binary case of $GF(2)$, primitive polynomials with three or five non-zero coefficients and with degrees of up to five thousand.

The randomness of outputs, sometimes herein referred to as "n-tuples", generated by a binary windmill polynomial of weight=3 is generally poor, so to increase the randomness of the outputs, a high-weight polynomial is required. But, such improved randomness occurs at the expense of increased processing requirements. Existing tables cannot always be used to select a windmill polynomial suitable from which to derive a pseudo-random number sequence as such existing tables do not necessarily show all primitive polynomials with a selected, e.g., three or five, number of non-zero coefficients. Particularly when the pseudo-random number sequences are used for an encryption process, knowledge of all windmill polynomials of a selected degree over the finite field GF(2) is valuable. Methods are not available by which to derive such knowledge. Instead, conventionally, a searching process, including a test for primitivity, such as the Knuth Allanen test, is performed.

Vanes taken from a conventional windmill generator are determinative of the bit-size of the outputs, i.e., the n-tuples, formed by the generator. As processing capabilities improve with successive generations of processing devices operable at increased processing speeds, conventional windmill generators having greater numbers of vanes become increasingly practical. A windmill generator having increased numbers of vanes is capable of generating larger bit-sized outputs. And, hence, a pseudo-random number sequence can be more quickly generated.

When a windmill generator configuration is compatible with a windmill generator of another configuration, the same pseudo-random number sequence is generated by the generators of each configuration. Such compatibility is generally required so that apparatus and processes utilizing windmill generators of the different configurations are all capable of operation to produce the same results.

There, however, is no existing manner by which simply to determine compatibility of different configurations of windmill generators. Conventionally, compatibility between separate configurations can be realized only by mapping one initial state of one configuration to that of another configuration. But such mapping requires a significant number of operations to be performed. Special windmill polynomials, however, permit a very simple transformation between configurations.

It would, accordingly, be advantageous to provide a manner by which to determine the compatibility of alternate configurations of windmill generators by which to generate a common pseudo-random number sequence.

It would further be advantageous to provide a windmill generator of simplified construction and capable of generating pseudo-random number sequences corresponding to a selected windmill polynomial but capable of simple conversion to alternate configurations, as desired.

It is in light of this background information related to the generation of pseudo-random number sequences that the significant improvements of the present invention have evolved.

SUMMARY OF THE INVENTION

The present invention, accordingly, advantageously provides a manner by which to determine the compatibility of alternate configurations of windmill generators by which to generate a common pseudo-random number sequence.

The present invention, accordingly, further advantageously provides a windmill generator of simplified construction and capable of generating pseudo-random number sequences corresponding to a selected windmill polynomial but capable of simple conversion to alternate configurations, as desired.

Configurations of windmill generators are identified which, when initialized to be of selected initial states, generate n-tuples which form the same pseudo-random number sequence. The identified configurations have simple relations to one another; that is to say, configurations are identified by which mere copying of initial state values in a selected relation result in operation of the different configurations generating the same pseudo-random number sequences. Such copying has a linear complexity in the dimension of a state space, i.e., the degree of the generating polynomial, and not a quadratic complexity, conventionally required to map one initial state to an equivalent other.

In one implementation, pseudo-random number sequences generated by a windmill generator of an embodiment of the present invention is used as a subcomponent to encrypt information to be transmitted by a sending station to a receiving station. In an exemplary implementation, the communication system forms a cellular communication system, and information to be communicated between a mobile terminal and network infrastructure of the cellular communication system is encrypted through the use of a pseudo-random number generated by the windmill generator. The encryption of a received, encrypted signal is analogously also performed with the utilization of the pseudo-random number sequence generated by a windmill generator, thereby to de-encrypt the encrypted signal.

In another aspect of the present invention, an efficient method is provided by which to generate efficiently consecutive blocks of pseudo-random noise sequence in particular maximum-length sequences and full-length sequences. Because a word-oriented memory implementation is utilized by which to form the pseudo-random number sequences, such sequences are generated quickly, without significant computational requirements. And, through proper selection of the memory word size, alternate configurations of windmill generators are realized to permit upward and backward compatibility of pseudo-random number sequences.

In these and other aspects, a method, and associated apparatus, generates a pseudo-random noise sequence. A set of memory elements is formed in which each memory element of the set stores a memory word of a selected word plane therein. Each of the memory elements is initialized with initial state values. The initial state values with which each of the memory elements is initialized form memory words stored therein. At least one of the memory words stored in at least one of the memory elements is selected to form an output sequence. The output sequence forms a portion of the pseudo-random noise sequence. At least one new memory word is selected to be stored in at least one of the memory elements of the set of memory elements. The new memory word is formed of selected combination of memory words stored in the memory elements of the set of memory elements. The at least one new memory word corresponds in number with the number of memory words selected to form the output sequence.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 5 illustrates initial state values for the configurations of windmill generators shown in FIGS. 1 and 3 and mappings therebetween by which both configurations can be caused to generate the same pseudo-random number output sequences.

FIG. 6 illustrates the output end-tuples determined in two separate manners.

FIG. 7 illustrates a table showing windmill polynomials of up to the one hundred twenty-seventh order and feasible values of v calculated during operation of an embodiment of the present invention.

FIG. 8 illustrates a method flow diagram listing the method steps by which to determine the feasible values shown in FIG. 7.

FIG. 9 illustrates a functional block diagram of a windmill generator of an embodiment of the present invention.

FIG. 10 illustrates the mapping of memory words during operation of the windmill generator shown in FIG. 9.

DETAILED DESCRIPTION

Figures 1, 2:
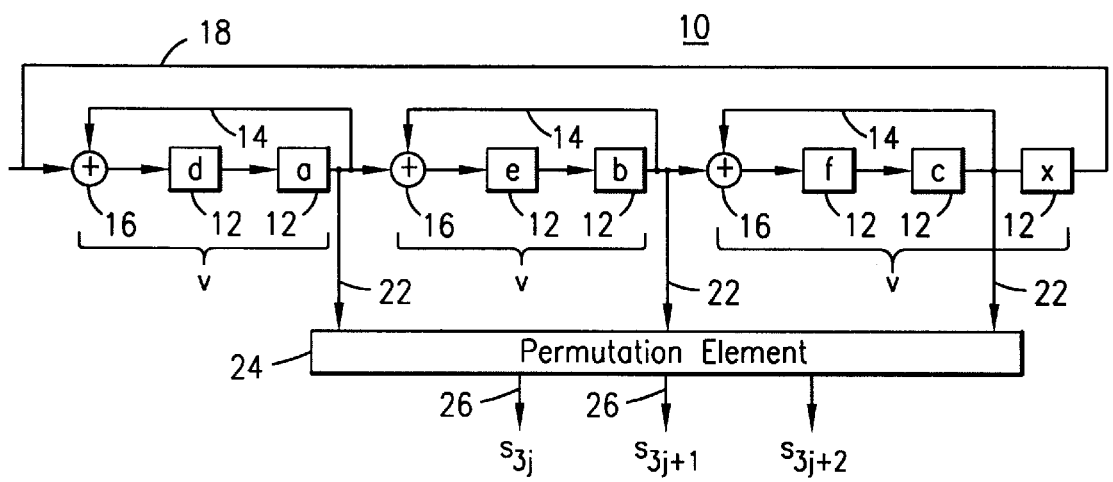
FIG. 1 illustrates a functional block diagram of a windmill generator of a first configuration, operable to generate three-tuples as outputs.
FIG. 2 illustrates a table listing the values at the delay elements of the windmill generator shown in FIG. 1 and the three-tuple outputs formed at successive iterations of operation of the windmill generator.

Referring first to FIG. 1, an exemplary windmill generator, shown generally at 10, is shown to be formed of a plurality of delay elements 12 and segregated into sets of vanes v. Here, each vane is of a vane length $L_i$, and each vane v includes a feedback loop 14 coupled to input terminals of summing elements 16. The right-most (as shown) vane v) is further coupled in a feedback loop 18 to a left-most vane v.

Taps 22 are taken from each of the vanes v and provided to a permutation element which performs permutation, here the identity permutation, upon the sequences provided by the taps 22. Output sequences formed by the permutation element 24 form the output end-tuples generated on the lines 26, here represented by $S_{3j}$, $S_{3j+1}$, $S_{3j+2}$.

The length L of each vane v is denoted by $L_i$ wherein $i=0,1,\ldots,v-1$. The set of lengths $L_0$ through $L_{v-1}$ are determined by a known formula. Of particular interest is when $L=L_0+L_1+\ldots+L_{v-1}$ satisfy the equations:

L=1 mod v (i.e. the remainder of L divided by v is 1) or

L=(v−1) mod v.

According to the first above-noted equation, the permutation performed by the permutation element 24 can be chosen to be the identity permutation, i.e., $0,1,\ldots,v-1$ maps to $0,1,\ldots,v-1$. In such case, the lengths $L_i$ are covered by the equation:

$$L_0=\ldots=L_{v-2}=(L-1)/v, L_{v-1}=1+(L-1)/v.$$

The output taps 22 are taken after each $(L-1)/v$-th delay element 12.

With respect to the second-above noted equation, the permutation can be chosen to be the "reverse order", i.e., $0,1,\ldots,v-1$ maps to $v-1,v-2,\ldots,1,0$. The lengths L, in such case, are defined by the following equation:

$$L_0=\ldots=L_{v-2}=(L+1)/v, L_{v-1}=-1+(L+1)/v.$$

The output taps 22 taken from each vane v are placed after each pth delay element 12 wherein p is a number that depends upon the largest possible compatible v value. Two values v and v' are compatible if a simple mapping exists between the initial state of the windmill generator 10 constructed with v and the initial state of the windmill generator 10 constructed with v' such that both windmill generators 10 generate the same output sequence. That is to say, the output generated by the windmill generator 10 satisfies the equation:

$$s_j = f_1 s_{j-1} + f_2 s_{j-2} + \ldots + f_L s_{(j-L)}$$

wherein $j=n,n+1,\ldots$ for some number n wherein the + sign is addition in the finite field GF(2) and $f(x)=1-f_1 x^1 - \ldots - f_{L-1}x^{L-1} - f_L x^L$.

FIG. 2 illustrates a table listing values at the delay elements 12 at successive iterations of operation of the windmill generator 10 at nine time intervals $j=0-8$. The right-most (as shown) columns of the table 28 list the outputs generated by the windmill generator 10 on the lines 22 and, due to the identity permutation performed by the permutation element 24, also on the lines 26.

Figures 3, 4:
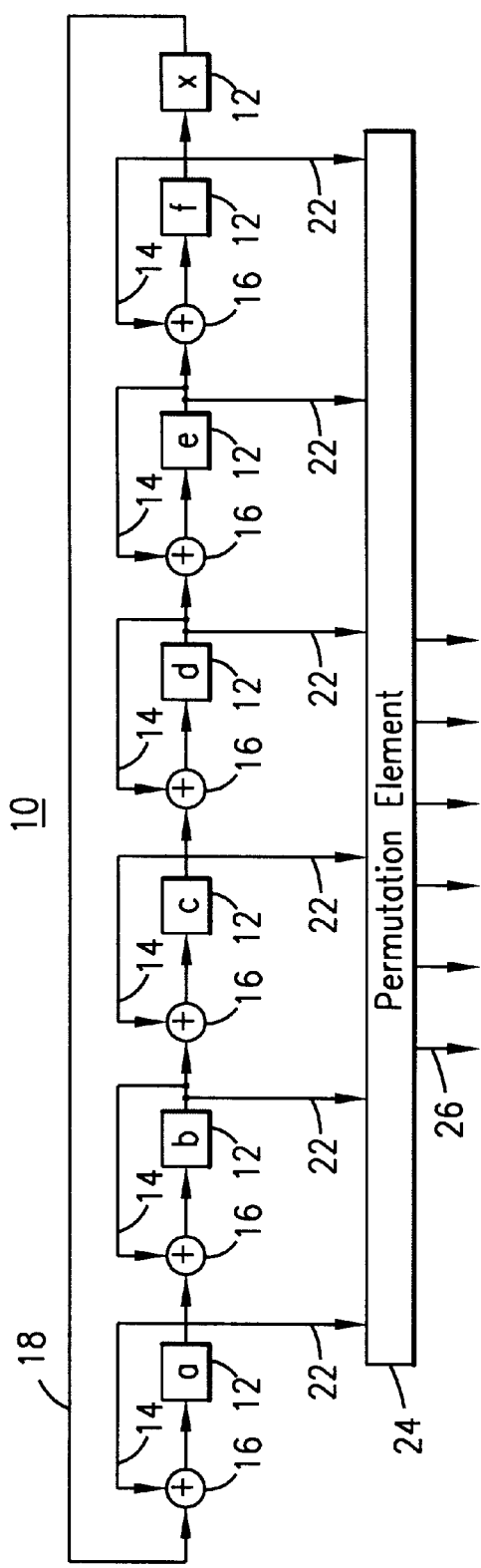
FIG. 3 illustrates a functional block diagram of a windmill generator of a second configuration, operable to generate six-tuples as outputs.
FIG. 4 illustrates a table listing the values at the delay elements of the windmill generator shown in FIG. 3 and the six-tuple outputs formed at successive iterations of operation of the windmill generator.

FIG. 3 illustrates a windmill generator, also formed of groups of vanes v, each having delay elements 12, feedback loops 14, and summation elements 16. A feedback loop 18 is also formed between the right-most (as shown) vane v and the left-most (as shown) vane v. Taps 22 are again taken off of the vanes v. Here, as the windmill generator 10 includes six vanes v, the generator 10 includes six taps 22. A permutation element 24 which performs an identity permutation and the outputs 26 therefrom are again shown.

FIG. 4 illustrates a table 34 containing a listing analogous to the listing of table 28 but here illustrating the state values of the delay elements 12 of the six-vane windmill generator shown in FIG. 3. The right-most (as shown) columns indicate the values tapped by the taps 22 and also generated on the lines 26. Comparison of the outputs, when sequenced together, of the windmill generators 10 shown in FIGS. 1 and 3 and tabulated at the tables 28 and 34 indicate their commonality.

Each vane v of the windmill generator 10 shown in FIG. 1 includes identical feedback connections. Analogously, each vane v of the windmill generator 10 shown in FIG. 3 also includes identical feedback connections which are derived from the windmill polynomial f(x). The windmill polynomial f(x) can be rewritten in terms of a first polynomial portion and a second polynomial portion, that is:

$f(x)=1-f_1 x^1 - \ldots -f_{L-1}x^{L-1}-x^L$, is an element of GF(q), $=b(x^v)-x^L$.

When the polynomial f(x) is recharacterized in this manner, the feedback at the vanes v is specified by the polynomial b(x).

In the binary case, i.e., when the finite field is GF(2), f(x) can be represented as:

$$f(x)=1+f_1 x^1 + \ldots + f_{L-1}x^{L-1}+x^L.$$

With respect to a windmill polynomial of the seventh degree, that is:

$$f(x)=x^7+x^6+1,$$

and of which the windmill generators shown in FIGS. 1 and 3 implement, the windmill polynomial can be rewritten as follows:

$$f(x)=b(x^3)+x^7$$

where $b(x)=1+x^2$. F(x) can also be rewritten in other manners, again formed of two separate polynomial portions such as, for example:

$$f(x)=b(x^6)+x^7$$

where $b(x)=1+x$ and $v=6$.

Through suitable selection of the initial state values of each of the delay elements 12 of the windmill generators shown in FIGS. 1 and 3, the separate configurations of windmill generators can be caused to generate the same pseudo-random number sequences formed of successive end-tuples generated on the lines 26 of the respective configurations of generators 10. When a windmill polynomial of degree L permits a windmill generator 10, operable according thereto, and having vi vanes or v2 vanes and which satisfy one of the aforementioned equations, i.e., 1=L mod v1=L mod v2 or v−1=L mod v1=L mod v2, simple mapping of initial state values permits different configurations to produce the same pseudo-random number sequence.

FIG. 5 illustrates the mapping for the exemplary seventh order windmill polynomial. The top-most (as shown) illustrates initial state values, indicated by the letters a, b, c, d, e, f, and x at the three vanes, Vane 2, Vane 1, and Vane 0, of the windmill generator 10 shown in FIG. 1. The bottom-most (as shown) portion of the Figure illustrates the initial state values mapped into the six vanes v, Vane 5, Vane 4, Vane 3, Vane 2, Vane 1, and Vane 0 of the windmill generator 10 shown in FIG. 3. Mapping of the initial state values as illustrated permits the separate configurations of windmill generators 10 pictured in FIGS. 1 and 3, respectively, to generate the same pseudo-random output sequence.

When v1−1=L mod v1, v2−1=L mod v2, simple mappings for compatible values of v, forming windmill generators of different configurations, can be determined by the following equation wherein p, i.e., the pth delay element 12, is a number that depends upon the largest possible compatible v value:

$$p=(L+1-v_{max})/v,$$

wherein $v_{max}$ is the largest compatible value of v for a given windmill polynomial.

For instance, when the windmill polynomial is of the seventeenth degree, i.e., $f(x)=x^{17}+x^{12}+1$, then $V_{max}=6$ and $p=4$.

FIG. 6 illustrates the output end-tuples for the two cases, defined above. At the left-most (as shown) portion of the Figure, the bits forming the output taps in each vane are taken from the column indicated by p while the right-most (as shown) portion of the Figure shows the output bits taken from a different column due to the different value of small $v_{max}$.

FIG. 7 illustrates a table of windmill polynomials up to the one hundred twenty-seventh degree which can be used to generate blocks of binary three-tuples. Each three-tuple represents an eight-valued integer number such that up to sixty-three n-tuples can be generated by a windmill generator operable to derive the same windmill polynomial. The table pictured in FIG. 7 further illustrates feasible values of vanes v forming different configurations of windmill generators capable of generating the same pseudo-random number sequences.

FIG. 8 illustrates a method, shown generally at 52, by which the feasible v values for each windmill polynomial are generated. The method 52 is operable to determine, for a selected windmill polynomial, compatibility of alternate configurations of a windmill polynomial generator by which to generate a common pseudo-random number sequence. First, and as indicated by the block 54, the selected windmill polynomial is characterized in terms of a first polynomial portion and a second polynomial portion. That is to say, the windmill polynomial f(x) is characterized in terms of $b(x^v)-x^L$, as described previously and f(x) is checked for primitivity. Then, and as indicated by the block 56, characterizations of the second polynomial portion which, when summed together with the first polynomial portion, forms the selected windmill polynomial. Each characterization of the second polynomial portion identifies a separate configuration of the windmill generator. That is, different values of $b(x^v)$ are chosen.

Then, and as indicated by the block 58, a determination is made whether each of the characterizations of $b(x^v)$ satisfies selected criteria. Namely, the selected criteria requires satisfaction of either 1=L mod v or v−1=L mod v.

Finally, and as indicated by the block 62, a characterization of the windmill generator is identified as a compatible alternate configuration if the characterization satisfies the selected criteria.

FIG. 9 illustrates a windmill generator, shown generally at 100, of an embodiment of the present invention. The windmill generator 100 is functionally equivalent to the windmill generators 10 shown in FIGS. 1 and 3, but here is implemented through the use of word-oriented memory. Here, a stack 102 of memory elements 104 is formed. Each of the memory elements 104 is of a selected word length and the stack 102 is formed of a selected number, M, of memory elements 104.

The value of M is determined according to one of the following equations:

$$M=2+(L-1)/v,$$

$$M=1+(L+1)/v.$$

The contents of the memory elements 104 are selectively acted upon through operation of a processing device 106, here operable to execute applications here represented by an initializer 108, an output sequence selector 112, and a new memory word selector 114. The initializer 108 is operable to initialize the memory elements with memory words of initial state values. The output sequence selector 112 is operable to cause a selected memory word to be read out to form an n-tuple output sequence. And, the new memory word selectors operable to select a new memory word to be written to a selected one or more memory elements 104 during operation of the generator 100.

FIG. 10 illustrates the mapping of memory words during operation of an embodiment of the invention. Once the memory elements have been initialized with initial state values through operation of the initializer 108, the memory words are iteratively shifted in manners indicated by the arrows 118 shown in the Figure. One of the memory words is read out of its memory element and forms the end-tuple output, through operation of the output sequence generator 112. And, a new input word, formed of a selected combination of portions of memory words stored in selected ones of the memory elements 104 is inserted into an available memory element 104 through operation of the new memory word selector 114. As illustrated, the contents of the elements of the memory words stored in the memory elements 104 are mapped columnwise. And, through operation of the new input word selector 114, a new memory word is inserted into an available memory element 104. Successive shifting of memory words, outputting of selected n-tuples, and formation of new input words permits a pseudo-random number sequence thereby to be formed. Because of the word orientation of the windmill generator 100, output n-tuples of multiple numbers of memory words stored in multiple numbers of memory elements 104 can be output during each iteration of operation of the generator 100 if increased numbers of n-tuple outputs are desired.

Figure 11:
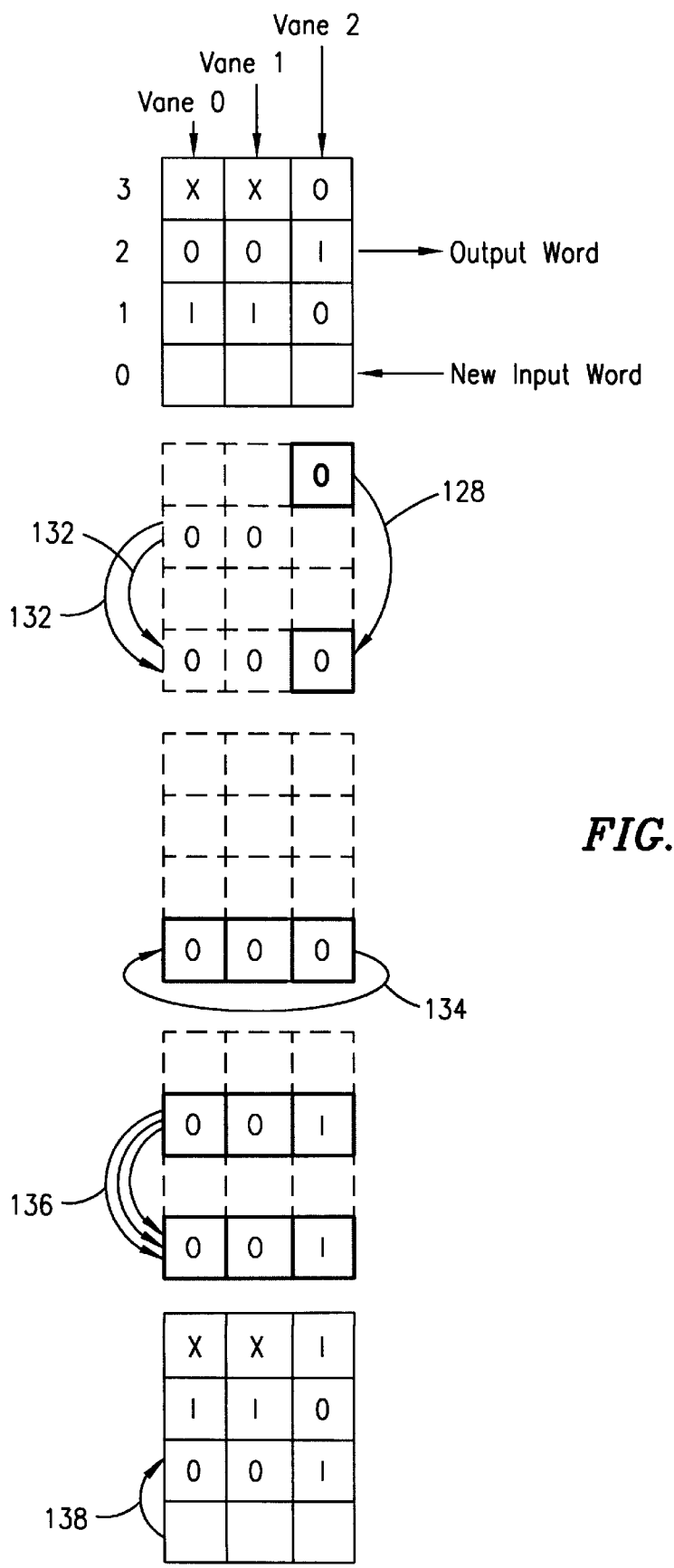
FIG. 11 illustrates the manner by which the new input word is formed during operation of the windmill generator shown in FIG. 9.

FIG. 11 illustrates the stack 102 of memory elements 104 shown previously in FIGS. 9 and 10, here to illustrate the manner by which the new memory word selector forms the values of a new memory word to be inserted into an available memory element. Once a memory word is output and forms an output n-tuple, and as indicated by the arrows 128 and 132, values of the last memory element of each vane are taken. Then, and as indicated by the arrow 134, the row so-formed is rotated cyclically through one position. Then, and as indicated by the arrow 136, an add-in feedback is formed. And, the word so-formed is shift upwardly in a columnwise manner, as indicated by the arrow 138.

Figure 12:
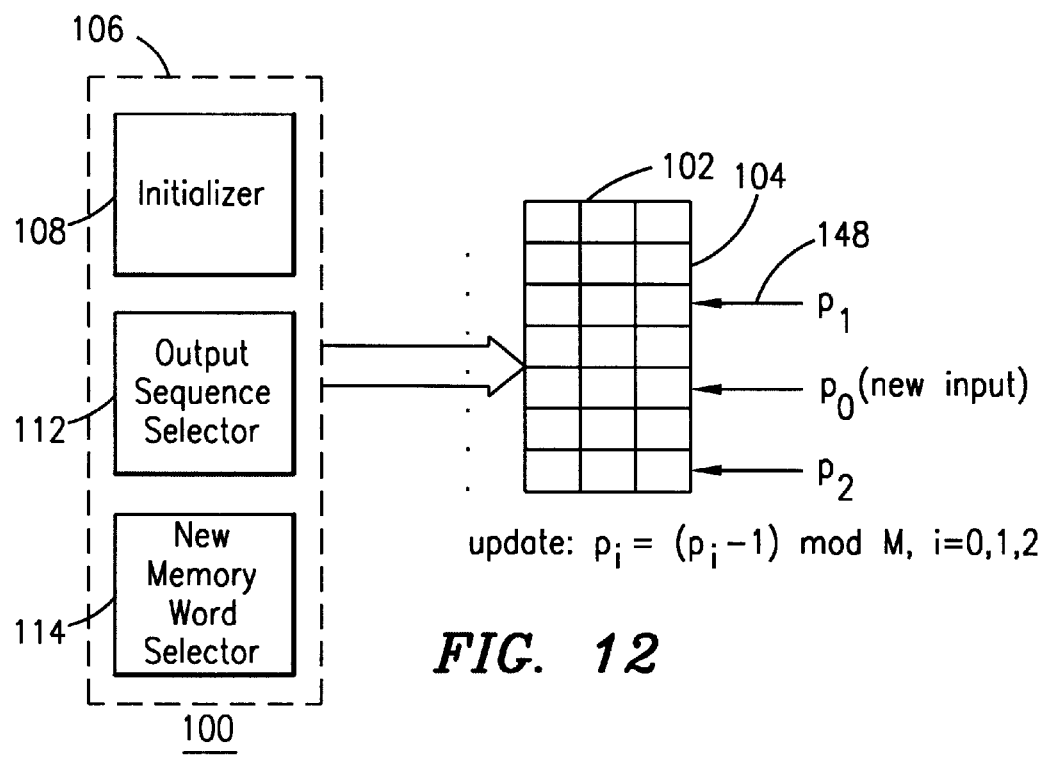
FIG. 12 illustrates a functional block diagram of a windmill generator of another embodiment of the present invention.

FIG. 12 indicates a windmill generator 100 of another embodiment of the present invention. Here, again, a stack 102 of memory elements 104 is formed wherein, again, memory words of length M are stored in the memory elements. And, again, a processing device 106 is operable to execute applications represented by the initializer 108, the output sequence selector 112, and the new memory word selector 114. Here, rather than shifting the contents of the memory words during each iteration of operation of the generator 100, a new input word pointer, here represented by the arrow 148, is moved cyclically amongst the M words of which the stack 102 is formed. That is to say, the new input word location is re-identified cyclically amongst the memory words. When low-power consumption is a significant operational goal, repositioning of the pointer 148 consumes less power than shifting each memory word throughout the stack 102.

Figure 13:
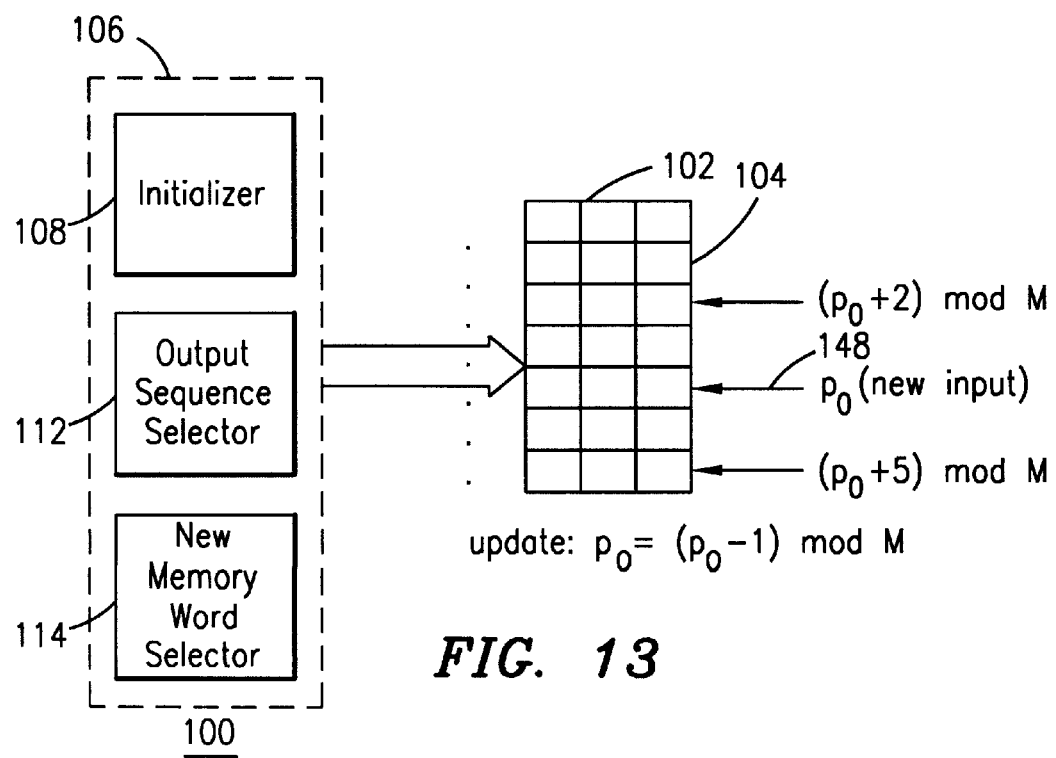
FIG. 13 illustrates a functional block diagram of another windmill generator of another embodiment of the present invention.

FIG. 13 illustrates a windmill generator 100 of an embodiment, similar to that shown in FIG. 12, but in which only one cyclically updated pointer 148 is utilized and only a set offsets to a point to the correct position of the words in the memory where data is to be read or stored.

Operation of the various embodiments of the present invention thereby permit the determination of compatible configurations of windmill generators for a selected windmill polynomial. Implementation of a word-oriented windmill generator is also provided in which pseudo-random number sequences are simply formed merely through successive reads of selected memory words during successive iterations of operation of the generator.

The previous descriptions are of preferred examples for implementing the invention, and the scope of the invention should not necessarily be limited by this description. The scope of the present invention is defined by the following claims.

What is claimed is:

1. A method for generating a pseudo-random noise sequence using a windmill generator, said method comprising the steps of:

forming a word-oriented memory including a set of memory elements, each memory element of the set for storing a memory word of a selected word length therein;

initializing each of the memory elements formed during said step of forming with initial state values, the initial state values with which each of the memory elements is initialized forming the memory word stored therein;

selecting a plurality of the memory words stored in the word-oriented memory to form a portion of the pseudo-random noise sequence during each iteration of operation of the windmill generator; and selecting a plurality of new memory words to be stored in the word-oriented memory, the new memory words each formed of a combination of memory words stored in the memory elements of the set of memory elements, the plurality of new memory words corresponding with the plurality of memory words selected in said step of selecting a plurality of memory words, wherein the selected word length of each memory word stored at each of the memory elements formed during said step of forming is selected such that each of the plurality of memory words selected during the step of selecting a plurality of memory words comprises at least one multiple of a single memory word, and wherein at least one multiple of the selected word length forms a compatible word length which enables two different windmill generators having different numbers of vanes to generate the same pseudo-random noise sequence.

2. The method of claim 1 wherein the pseudo-random noise sequence is of values corresponding to values generated by a windmill polynomial of a selected degree, the selected degree, at least in part, determinative of the number of memory elements of the set of memory elements formed during said step of forming.

3. The method of claim 2 wherein the number of memory elements of the set of memory elements is further responsive to the selected word length of which each of the memory words is formed.

4. The method of claim 3 wherein the number of memory elements forming the set of memory elements is directly proportional to the selected degree and is indirectly proportional to the selected word length of which each of the memory words is formed.

5. The method of claim 2 wherein the set of memory elements formed during said step of forming comprise a logically contiguous group of memory elements, forming a stack of memory words, at least one memory element of the stack of memory elements selected to form an output memory element, and wherein the plurality of memory words selected during said step of selecting the plurality of memory words comprises the at least one memory word stored at the output memory element.

6. The method of claim 5 wherein successive ones of the logically contiguous group of memory elements define columns and wherein said method comprises the additional step of shifting, in columnwise fashion, memory words through the stack of memory elements.

7. The method of claim 6 wherein the plurality of new memory words selected during said step of selecting a plurality of new memory words comprises a memory word of values corresponding to feedback values generated by the windmill polynomial of the selected degree.

8. The method of claim 1 comprising the additional step of assigning at least one cyclically updatable pointer to at least selected ones of the memory elements.

9. The method of claim 8 wherein the at least one cyclically updatable pointer assigned during said step of assigning identifies the plurality of memory elements at which the plurality of memory words selected during said step of selecting the plurality of memory words are stored.

10. The method of claim 9 wherein the at least one cyclically updatable pointer assigned during said step of assigning identifies the plurality of new memory elements, at which the plurality of new memory words selected during said step of selecting are to be stored.

11. The method of claim 1 wherein said steps of selecting the plurality of memory words to form the pseudo-random noise sequence and selecting the plurality of new memory words are performed iteratively.

12. A method for determining, for a selected windmill polynomial, compatibility of alternate configurations of windmill polynomial generators by which to generate a common pseudo-random sequence, the selected windmill polynomial identified by a windmill polynomial degree and a windmill polynomial weight, said method comprising the steps of:

characterizing the selected polynomial in terms of a first polynomial portion and a second polynomial portion, the first polynomial portion of a first polynomial-portion degree, the first polynomial-portion degree corresponding to the windmill polynomial degree of the selected windmill polynomial;

determining characterizations of the second polynomial portion which, when summed together with the first polynomial portion, forms the selected windmill polynomial, each characterization identifying a separate configuration of the windmill generator;

determining whether each of the characterizations of the second polynomial portion satisfies selected criteria; and identifying a characterization of the windmill generator as a compatible alternate configuration if the characterization satisfies the selected criteria.

13. The method of claim 12 wherein each characterization of the second polynomial portion has associated therewith a design exponent, the design exponent identifying a word size.

14. The method of claim 12 wherein the selected criteria by which a determination is made during said step of determining whether the second polynomial portion satisfies the selected criteria comprises the equation:

$$1 = L \bmod v$$

wherein

L is the degree of the selected windmill polynomial; and v is the design exponent associated with the second polynomial-portion.

15. The method of claim 12 wherein the selected criteria by which a determination is made during said step of determining whether each of the characterizations satisfies the selected criteria comprises the equation:

$$v - 1 = L \bmod v$$

wherein:

L is the degree of the selected windmill polynomial; and v is the design exponent associated with the second polynomial-portion.

16. A pseudo-random noise windmill generator for generating a pseudo-random noise sequence, said pseudo-random noise windmill generator comprising:

a word-oriented memory including a set of memory elements, each memory element of said set for storing a selected memory word of a selected word length therein;

an initializer for initializing each of the memory elements of said set with initial state values, the initial state values with which each of the memory elements is initialized forming the memory word stored therein;

an output sequence selector for selecting a plurality of the memory words stored in the word oriented memory to form a portion of the pseudo-random noise sequence during each iteration of operation of the windmill generator; and a new memory word selector for selecting a plurality of new memory words to be stored in the word-oriented memory, the new memory words each formed of a selected combination of memory words stored in the memory elements of the set of memory elements, the plurality of new memory words corresponding with the plurality of memory words selected to form the portion of the pseudo-random noise sequence, wherein the selected word length of each memory word stored at each of the memory elements is selected such that each of the plurality of memory words selected by the output sequence selector comprises at least one multiple of a single memory word, and wherein at least one multiple of the selected word length forms a compatible word length which enables two different windmill generators having different numbers of vanes to generate the same pseudo-random noise sequence.

17. Apparatus for determining, for a selected windmill polynomial, compatibility of alternate configurations of windmill polynomial generators by which to generate a common pseudo-random sequence, the selected windmill polynomial identified by a windmill polynomial degree and a windmill polynomial weight sequence, said apparatus comprising:

a characterizer coupled to receive indications of the selected polynomial, said characterizer for characterizing the selected polynomial in terms of a first polynomial portion and a second polynomial portion, the first polynomial portion of a first polynomial-portion degree, the first polynomial-portion degree corresponding to the windmill polynomial degree of the selected windmill polynomial;

a determiner coupled to receive indications of characterizations formed by said characterizer, said determiner for determining characterizations of the second polynomial portion which, when summed together with the first polynomial portion, forms the selected windmill polynomial, each characterization identifying a separate configuration of the windmill generator and for determining whether each of the characterizations of the second polynomial portion satisfies selected criteria; and an identifier operable responsive to said determiner, said identifier for identifying a characterization of the windmill generator as a compatible alternate configuration if the characterization satisfies the selected criteria.

18. The method of claim 1, wherein said windmill generator implements a binary windmill polynomial with a finite field GF(2).

19. The pseudo-random noise windmill generator of claim 16, wherein said windmill generator generates a binary pseudo-random noise sequence by implementing a binary windmill polynomial with a finite field GF(2).

* * * * *

UNITED STATES PATENT AND TRADEMARK OFFICE
CERTIFICATE OF CORRECTION

PATENT NO. : 6,339,645 B2
DATED : January 15, 2002
INVENTOR(S) : Bernard Jan Marie Smeets It is certified that error appears in the above-identified patent and that said Letters Patent is hereby corrected as shown below:

<u>Title page,</u>
Item [75], replace "Bernhard" with -- Bernard --

Signed and Sealed this

Sixth Day of August, 2002

Attest:

Attesting Officer

JAMES E. ROGAN
*Director of the United States Patent and Trademark Office*